C. L. GILMORE.
COMBINED ROOST AND NEST.
APPLICATION FILED APR. 2, 1919.

1,314,075.

Patented Aug. 26, 1919.
2 SHEETS—SHEET 1.

WITNESS:
Guy M. Spring
H. B. Vrooman

INVENTOR.
Calvin L. Gilmore
BY
Richard Bellwen.
ATTORNEY.

C. L. GILMORE.
COMBINED ROOST AND NEST.
APPLICATION FILED APR. 2, 1919.
1,314,075.
Patented Aug. 26, 1919.
2 SHEETS—SHEET 2.
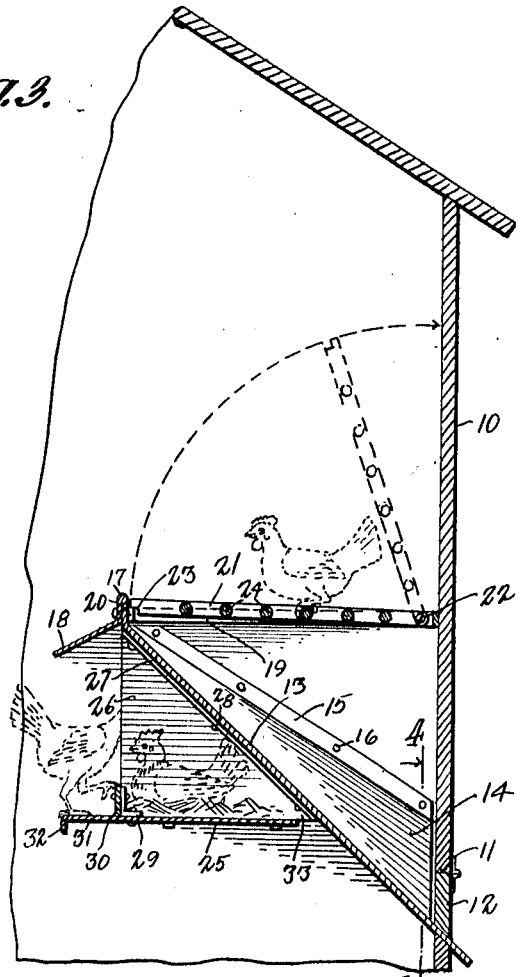
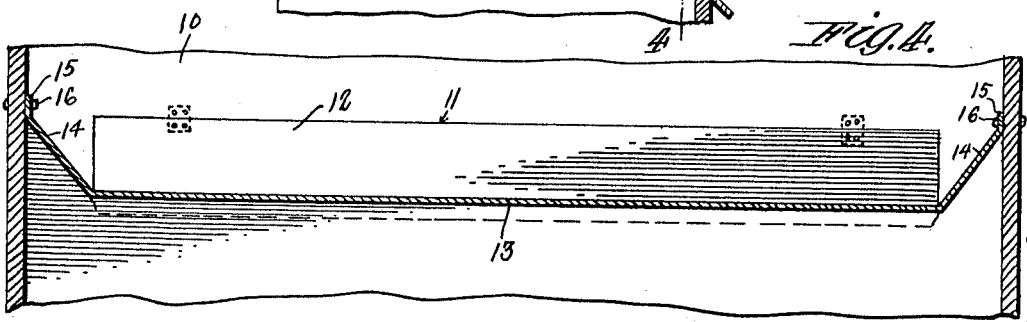
WITNESS:
Guy M. Spring
H. B. Vrooman
INVENTOR.
Calvin L. Gilmore
BY
Richard B. Owen
ATTORNEY.

UNITED STATES PATENT OFFICE.

CALVIN L. GILMORE, OF DALLAS, TEXAS.

COMBINED ROOST AND NEST.

1,314,075.  Specification of Letters Patent.  Patented Aug. 26, 1919.

Application filed April 2, 1919. Serial No. 286,880.

*To all whom it may concern:*

Be it known that I, CALVIN L. GILMORE, a citizen of the United States, residing at Dallas, in the county of Dallas and State of Texas, have invented certain new and useful Improvements in Combined Roosts and Nests, of which the following is a specification.

This invention relates to a combined roost and nest for poultry and has for its principal object the production of a device of this nature which is constructed to increase the sanitation of such structures.

Another object of this invention is the production of a combined roost and nest wherein a chute is provided which constitutes the top of the nests carried therebelow although this chute is carried directly below the roost, thus receiving excreta or feces dropped by fowls resting upon the roost and directing such refuse toward a place where the same can be easily discharged or removed.

Another object of this invention is the production of a hingedly mounted roost carried directly above the chute, whereby when desired the roost may be swung to an inoperative position to allow of free access to the chute.

A still further object of this invention is the production of a combined roost and nest, wherein the nests are formed directly below the chute which forms the top or cover therefor while a protector wall is provided in front of the nests above the base portion thereof and a supporting platform is provided in front of the wall, thus allowing the fowls to gain easy access to the nests.

One practical form of construction and assembly of the present invention will be hereinafter described and is illustrated in the drawings, in which:—

Fig. 3 is a vertical section taken on the line 3—3 of Fig. 2.

Fig. 4 is a fragmentary detail section taken on the line 4—4 of Fig. 3.

In the preferred embodiment of the present invention about to be described, it will be seen that for the purpose of illustration a coop or house is indicated in general at 10 and is provided with an opening 11 normally closed by a trap door 12. Of course any desired form of a coop or house may be provided without departing from the spirit of the present invention which relates specifically to the combined roost and nest.

Figure 1:
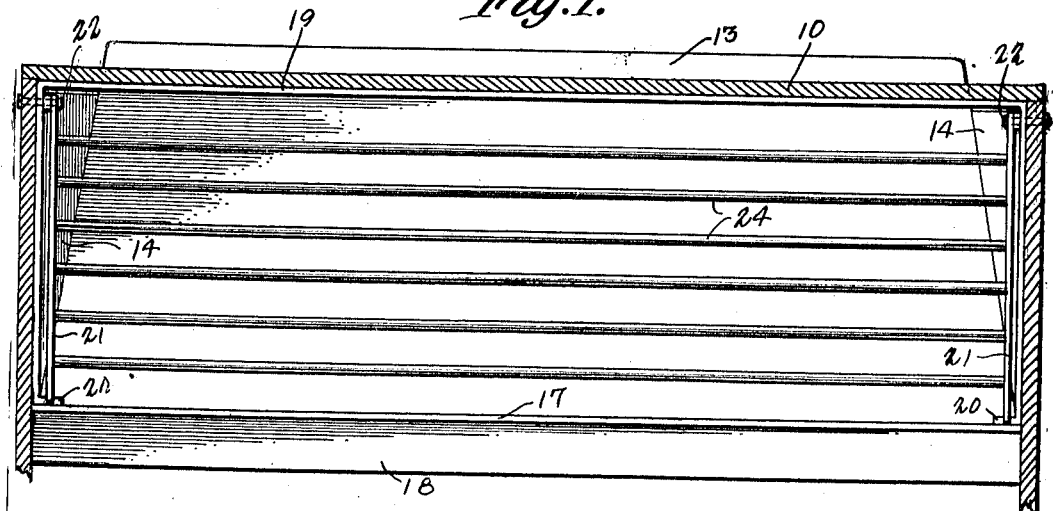
Figure 1 is a top plan view of the combined roost and nest, the supporting structure or building in which the device is carried being shown in section.
Figure 2:
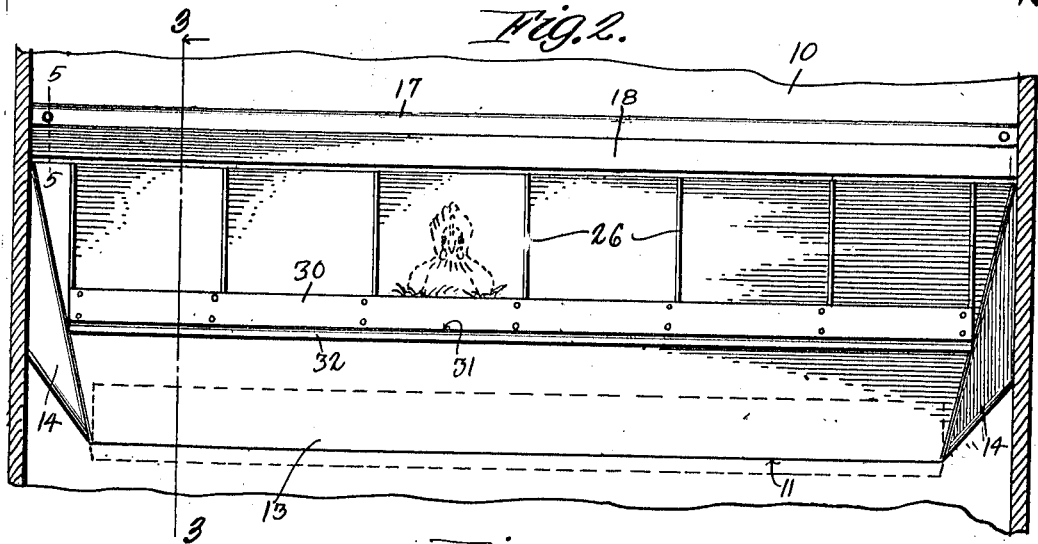
Fig. 2 is an elevation of the combined roost and nest.
Figure 5:
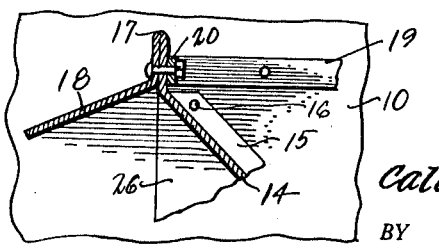
Fig. 5 is an enlarged fragmentary sectional view through a portion of the device taken on the line 5—5 of Fig. 2, the supporting roost being removed.

The chute 13 is elongated and slants downwardly as shown in Figs. 2, 3 and 4. This chute 13 is provided at its ends with the upwardly slanting diverging walls 14 having flanges 15 upon their edges. Securing means 16 are passed through the flanges 15 and thus secure the chute 13 to the supporting structure 10. It will be noted by referring particularly to Figs. 2 and 4, that the walls 14 converge toward their lower ends to direct refuse over onto the body of the chute 13. This body extends through the opening 11 in the structure 10 and for this reason when the trap door 12 is opened, such refuse as excreta and feces will be directed outwardly through the opening 11, to be discharged from the chute. The forward upper edge of the chute body is extended vertically and doubled upon itself to form a reinforced supporting rib 17 from which extends forwardly and downwardly a protector hood 18. A supporting frame 19 is provided and consists of a strip of metal which is substantially U-shaped in construction having inwardly bent ends 20, whereby the frame will be connected to the supporting structure 10 and will also have its ends secured to the rib 17 as shown in Fig. 5.

The roost consists of a pair of end bars 21 which are carried by bolts or other securing members 22 upon the frame 19. These end bars 21 are therefore pivotally supported while it will be noted that the forward ends of these bars are notched as shown at 23 to allow the same to engage the inwardly bent ends 20 of the frame 19 to be efficiently supported at their forward ends. The longitudinally extending roost bars 24 extend parallel to each other and have their ends carried by the end bars 21 of the roost thus forming a very rigid and efficiently supported roost which may be carried in a horizontal position to allow fowls to easily roost or perch thereon although when desired the roost may be swung upwardly as indicated in dotted lines in Fig. 3, when access is desired to the chute 13.

A supporting base 25 extends horizontally below the chute 13 and is connected to the chute by the partitions 26. These partitions are secured in any desired manner to the base 25 and also by flanges 27 and securing members 28 to the chute 13 thus forming a plurality of nests directly below the chute 13. The base 25 has an angle iron 29 secured thereto to support a comparatively low front wall 30 in front of the nest at the forward edges of the partitions 26 to retain material which may be placed within the nest. It will be noted however, the base 25 extends beyond the front wall 30 to provide a supporting platform 31 having a depending flange 32 to prevent injury to the feet of the fowls which may alight on the platform 31. As the platform is formed directly in front of the nests, it is obvious that fowls may alight thereon and then easily pass into the interior of the nests. Furthermore attention is invited to the fact that the rear edge of the base 25 is spaced from the under-surface of the chute 13 thus providing a discharge opening 33 through which the refuse within the nests may be easily swept when the nests are being cleaned.

It will be noted that the hood 18 depends in front of the nests and thus protects the same so that in the event a fowl should be roosting upon the rib 17, excreta or feces dropped by the fowl would be caught by the hood 18 and held thereby or else be discharged without falling into the nest or upon the platform 31.

It will be noted that the greater part of the combined roost and nest structure is formed of sheet metal and for this reason can be easily cleaned since few crevices are provided in which the usual mites or chicken lice so common among poultry can collect. When hens desire to enter the nest it is obvious they may alight on the platform 31 and then pass into the nests and as partitions are provided the nests are independent and hens are shielded from annoyance by other fowls. The provision of an opening 33 at the rear of each nest allows the same to be easily cleaned and kept in a sanitary condition, while the provision of the hood will also protect the nests and platform as above specified.

When the roost is carried in a horizontal position as shown in Fig. 3 fowls may easily alight thereon to roost or perch in the usual manner and it is apparent that the excreta or feces dropped by such fowls will be received on the chute 13. Owing to the angle of inclination of the chute such refuse will be directed downwardly toward the lower end of the chute while the angles of the walls 14 at the ends of the chute will direct the refuse onto the body portion of the chute. Accordingly when the trap door 12 is opened such refuse will pass outwardly from the chute through the opening 11. At such time the roost may also be swung upwardly in the manner indicated in dotted lines in Fig. 3 and therefore access may be had to the chute so that a liquid may be applied thereto for cleaning the same or the same may be brushed or any other access desired may be easily had. After the chute has been cleaned, the roost may again be swung downwardly so that the notched ends of the bars 21 may be received by the ends 20 of the frame 19 causing the device to be in condition for use and at this time the trap door 12 may be again closed.

It is therefore obvious that a combined roost and nest structure has been provided wherein the nests are arranged for convenient access as is the roost, although the parts are assembled to allow the same to be easily cleaned when necessary, thus causing the device to be capable of a maximum condition of sanitation at all times.

The foregoing description and the accompanying drawings have reference to what might be considered to be the approved or preferred form of my invention. I desire it to be understood that I may make such changes in the construction, combination and arrangement of parts, materials, dimensions, et cetera as may prove expedient and fall within the scope of the appended claims.

Having thus fully described my invention what I claim as new and desire to secure by Letters Patent, is:

1. In combination with a supporting structure having an opening provided with a removable closure, of a combined roost and nest consisting of an inclined chute, said chute having slanting end walls provided with flanges secured to said supporting structure, said chute extending through said opening, the upper forward portion of said chute being doubled upon itself to provide a reinforcing rib having a forwardly extending hood, a rectangular frame carried by said supporting structure and having inwardly turned ends fixed upon said rib, a roost consisting of end bars pivotally mounted upon said frame and having notched forward ends for engaging said inturned ends of said frame, parallel roost bars carried by said end bars, a base positioned below said chute, vertical partitions carried by said base and supported by said chute, thus forming independent nests, and said hood extending in front of said nests for protecting the same.

2. In combination with the supporting structure having an opening provided with a movable closure, of a combined roost and nest consisting of an inclined chute, said chute having slanting end walls provided with flanges secured to said supporting structure, said chute extending through said opening, the upper portion of said chute being doubled upon itself to provide a reinforcing rib having a forwardly extending hood, a roost movably mounted above said chute having its forward portion carried by said rib, a base positioned below said chute, vertical partitions carried by said base and supported by said chute, thus forming independent nests, and said hood extending in front of said nests for protecting the same.

3. In combination with a supporting structure, a combined roost and nest consisting of an inclined chute carried by said supporting structure, the upper forward portion of said chute being doubled upon itself to provide a reinforcing rib having a forwardly extending hood, a rectangular frame carried by said supporting structure and having inwardly turned ends fixed upon said rib, a roost consisting of end bars pivotally mounted upon said frame and having notched forward ends for engaging said inturned ends of said frame, parallel roost bars carried by said end bars, and nests carried below and supported by said chute and said hood extending in front of said nest for protecting the same.

In testimony whereof I affix my signature in presence of two witnesses.

CALVIN L. GILMORE.

Witnesses:
FRANK T. PAYNE,
HENRY BOLICKE.

Copies of this patent may be obtained for five cents each, by addressing the "Commissioner of Patents, Washington, D. C."